J. ERIKSON.
LUBRICATOR.
APPLICATION FILED APR. 9, 1910.
1,000,791.
Patented Aug. 15, 1911.
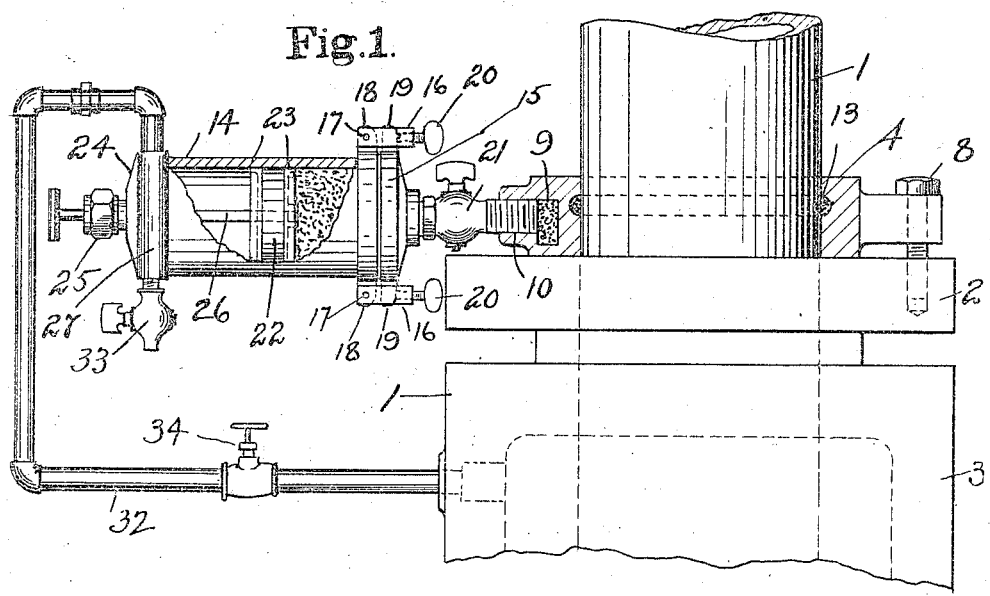
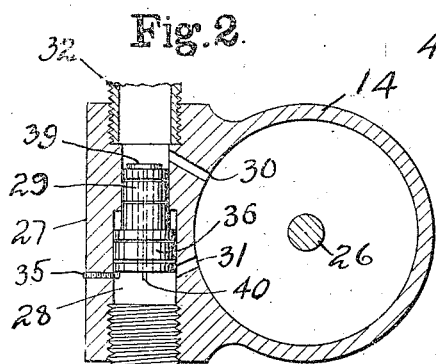
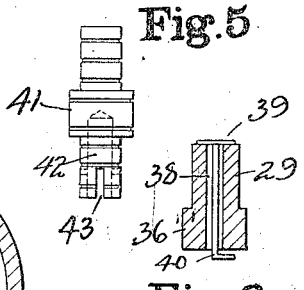
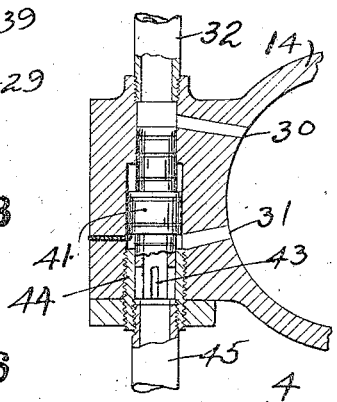
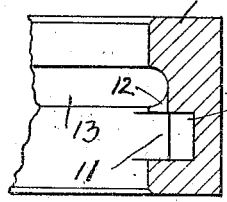
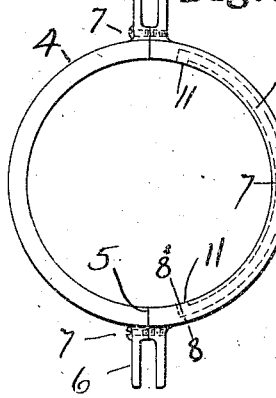
WITNESSES
Herbert L. Kelley
E. D. Ogden
INVENTOR
John Erikson
BY
Howard E. Barlow
ATTORNEY

UNITED STATES PATENT OFFICE.

JOHN ERIKSON, OF PROVIDENCE, RHODE ISLAND.

LUBRICATOR.

1,000,791. Specification of Letters Patent. Patented Aug. 15, 1911.

Application filed April 9, 1910. Serial No. 554,471.

*To all whom it may concern:*

Be it known that I, JOHN ERIKSON, a citizen of the United States, residing at the city of Providence, in the county of Providence and State of Rhode Island, have invented certain new and useful Improvements in Lubricators, of which the following is a specification, reference being had therein to the accompanying drawing.

This invention relates to lubricators of the class to be automatically actuated to lubricate moving plungers, piston rods, and the like, and the object of this invention is to provide a lubricating device adapted to be readily applied to the moving part, the same being actuated by pressure to supply the lubricant to said part.

A further object is to provide a controlling valve for automatically regulating the action of the pressure on the lubricator plunger and cause the lubricant to be fed intermittently to the moving part, means being also provided for controlling the frequency of the impulses.

With these and other objects in view, the invention consists of certain novel features of construction, as will be more fully described and particularly pointed out in the appended claims.

In the accompanying drawings: Figure 1— shows my improved lubricating apparatus as operating upon an elevator plunger. Fig. 2— is an enlarged cross section through the head of the grease cylinder showing the valve which controls the pressure passageways. Fig. 3— is a sectional detail of the controlling valve. Fig. 4— is a sectional view illustrating a modified form of controlling valve. Fig. 5— is a detail of said modified form of valve. Fig. 6— is a plan view of the ring that embraces the moving member to be lubricated and into a groove in which the lubricant is forced. Fig. 7— is an enlarged section on line 7—7 of Fig. 6 at the point where the lubricating receptacle is attached. Fig. 8— is an enlarged section on line 8—8 of Fig. 6 at the point where the supply duct communicates with the annular groove in the ring.

My improved lubricating device may be arranged to automatically lubricate any moving parts of machinery, but the same is more particularly adapted for application to the plunger 1 of the usual plunger type of elevator. This plunger usually stands vertically and reciprocates through a packing gland 2 into its casing 3 below. In order that my device may be readily applied to elevators already installed I have provided a ring 4 preferably of metal, the same being made in halves or split at 5, each half being provided with ears 6—6, through which bolts 7—7 are arranged for securing the halves together about the plunger 1. These ears 6 are also forked to receive the bolts 8 which secure the ring in position to the packing gland or other suitable adjacent supporting means.

A chamber 9 is formed within the walls of this ring the center portion of which communicates with the inlet 10, said chamber following around both ways from said inlet nearly one-half the circumference of the ring and provided at its ends only with openings 11—11 which are cut through the inner surface and upward to communicate as at 12, see Figs. 6 and 8, with the annular lubricant receiving and applying groove 13 formed on the internal surface of the ring.

The grease cup is preferably made in the form of a cylinder 14 the inner end of which is provided with a head 15 which may be secured thereto by any suitable means, but preferably by means of clamps 16—16 which are pivoted at 17 to ears 18—18 on the cylinder, said clamps being adapted to swing down over ears 19—19 on the head 15 against which latter ears the screws 20—20 may be set to hold the head firmly in position and at the same time permit of its ready removal for the purpose of re-charging the cylinder with lubricating material. This head is shown as being connected to the lubricating ring through the stop cock 21.

The piston 22 is packed on both faces by cup packings 23 and is arranged to be reciprocated within the cylinder for the purpose of forcing the lubricant therefrom. The opposite cylinder head 24 may be secured in position by any suitable means and is provided with the usual packing gland 25 through which the piston rod 26 extends. This head is also provided with an extending portion 27 which is chambered out at 28 for the reception of the pilot or controlling valve 29, which valve controls the ports 30 and 31. Water pressure may be admitted from any source but is preferably admitted from the elevator plunger casing 3 through the pipe 32 into said head 24; the opposite end of the valve recess is provided with a pet or drip cock 33.

In operating the device the water pressure is admitted from the casing 3 through valve 34, and pipe 32 which pressure carries the controlling valve 29 down against the stop screw 35 and passes into the cylinder 14 through port 30 giving the piston 22 an inward impulse and forcing a portion of the grease in said cylinder through the pet-cock 21, channel 9 and annular groove 13 to come in direct contact with and lubricate the reciprocating plunger 1. The pressure then passes out through port 31 and acting on the larger area 36 of valve 29 carries the same upward and causes the port 30 to be closed until such time as the pressure in pipe 32 has accumulated sufficient to overbalance that in the cylinder, or the pressure in the cylinder has decreased (by the recession of the grease) to less than that in the pipe, then the piston 29 is again forced downward and the water trapped in chamber 28 passes up through the center valve channel 38, lifting the relief valve 39, which is hung on the stem 40, allowing said controlling valve to again be forced down to its position against the stop screw 35 permitting the pressure to again act upon the piston 22. It will be understood of course that owing to the fact that the pressure in the cylinder 14 and in the pipe 32 and chamber 28, is obtained from the water admitted from casing 3, said water pressure instantly disappears when the piston 22 yields in the act of forcing grease to the point where it is needed. The movements of this valve are comparatively slow forcing the grease at intervals against the plunger as the elevator is moving in its upward direction, and the frequency of these movements may be controlled to said existing conditions by regulating the opening through the gate valve 34.

The modification illustrated in Figs. 4 and 5 shows a controlling valve 41, the lower end of which is provided with a hollow center portion 42 and slots or apertures 43 communicating therewith. This end is adapted to extend down into the tube 44, which tube is threaded into the casing for the purpose of adjustment to regulate the extent of the opening of the apertures 43 through which the pressure in the cylinder may escape when said valve is raised to close the inlet port 30, whereby the quickness of action of the valve and frequency of pressure impulses may be controlled. This tube is shown as being connected with an exhaust pipe 45 which may lead back to the tank or other convenient receptacle for the waste. The action of valve 41 in the form shown in Fig. 4 is very much quicker than that of valve 29 in the form shown in Fig. 2 as when this latter valve is raised to shut off the inlet port 30 the pressure through the outlet port 31 is quickly relieved through the apertures 43 and pipe 45, thereby permitting the pressure in pipe 32 to again act upon the valve forcing it downward to give another impulse to the grease supplying piston. It will therefore be seen that a valve of this latter construction is adapted to vibrate continually or work with quick impulses, causing a small amount of grease to be forced out at short intervals, which arrangement is more particularly adapted for use on rapid running or express elevators.

Having thus described my invention, what I claim is:

1. A lubricator comprising a lubricant container, an adjacent chamber having two ports communicating with said container, and a valve in said adjacent chamber, said valve having port-closing portions spaced differently from the distance between said two ports whereby the opening and closing of the two ports will occur alternately and not simultaneously.

2. A lubricator comprising a lubricant container, an adjacent chamber having one portion of greater diameter than the other one, an inlet port being provided from the smaller chamber to said container, an outlet being provided from the container to the larger portion of the chamber, and a valve having portions of different diameters to fit the two portions of the chamber having different diameters, said valve being of a length to alternately open and close the inlet and outlet as said valve reciprocates.

3. A lubricator comprising a lubricant container having heads one of which is removable to enable grease to be supplied to said container, a piston in said container, an adjacent chamber having ports communicating with the lubricant container, and a valve in said adjacent chamber, said valve being of a length less than the distance between the two ports to alternately open and close the two said ports as the valve reciprocates and permit one port to be open when the other is closed.

4. A lubricating device comprising a member adapted to be connected to the part to be lubricated said member being provided with a recess in its surface through which the lubricant is applied, a container for the lubricant connected to said member, a pressure connection to said container provided with a chamber, a valve movable in said chamber each end of said valve being of a different area whereby the same is adapted to be opened by the initial or entrance pressure and closed by the pressure from within the cylinder for automatically causing an intermittent action of said pressure on the lubricant.

5. A lubricating device comprising a ring adapted to be readily connected to the part to be lubricated, said ring being provided with an annular recess in its interior surface through which the lubricant is applied, a lubricant container connected to said ring, a piston in said container, a pressure connection to said container provided with a chamber, a controlling valve movably mounted in said chamber, and means for imparting to said valve a reciprocating action whereby the pressure is caused to exert an intermittent action on said piston to force the lubricant at intervals from said container.

In testimony whereof I affix my signature in presence of two witnesses.

JOHN ERIKSON.

Witnesses:
　HOWARD E. BARLOW,
　E. I. OGDEN.